F. HAMMERLY.
BRUSH AX.
APPLICATION FILED NOV. 21, 1907.
914,947.
Patented Mar. 9, 1909.
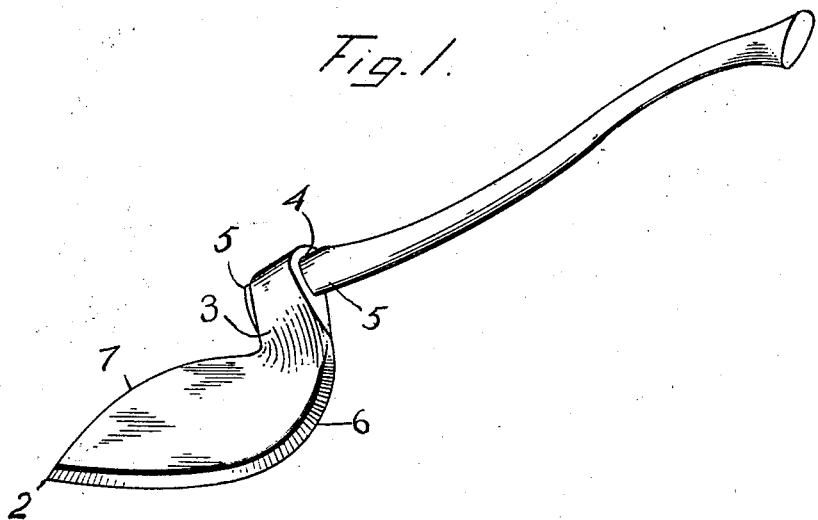
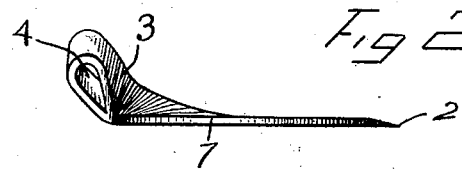
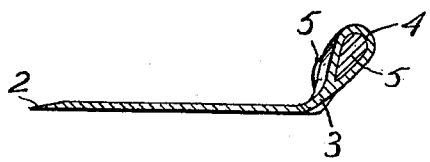
Witnesses
J. C. Simpson
M. J. Miller
Inventor
Fred Hammerly
By
Attorneys

UNITED STATES PATENT OFFICE.

FRED HAMMERLY, OF SILVANA, WASHINGTON.

BRUSH-AX.

No. 914,947.

Specification of Letters Patent.

Patented March 9, 1909.

Application filed November 21, 1907. Serial No. 403,222.

*To all whom it may concern:*

Be it known that I, FRED HAMMERLY, a citizen of the United States, residing at Silvana, in the county of Snohomish, State of Washington, have invented certain new and useful Improvements in Brush-Axes; and I do hereby declare the following to be a full, clear, and exact description of the invention, such as will enable others skilled in the art to which it appertains to make and use the same.

This invention has relation to tools designed to cut brush and briers and other growth that is liable to spring up along fences and newly-cleared land or where land is left fallow for a considerable length of time, and a new and noxious growth springs up. The tool is operated somewhat on the principle of a pole-ax—that is by strokes on the base of the brush and briers as near the ground as may be done without danger of striking stones and so dulling the tool.

It is the object of the invention to provide a blade that shall be more efficient than a pole-ax, in that when a brush is bent over, or even when it stands straight, by striking it at the base, the blade will act with a shear cut, severing the brush and leaving a substantially short flat-top stump.

My improvement is illustrated in the annexed drawing, forming a part of this specification, the same characters of reference designating the same parts wherever they occur.

Of the said drawings, Figure 1 is a perspective view of the invention complete. Fig. 2 is a plan of the blade with the handle omitted. Fig. 3 is a sectional view through the blade from the end containing the handle-eye to the point.

In carrying out my invention I make the blade as thin as may be thought best, and of substantially oval form in side view, excepting that it is quite pointed at its forward end 2 and at its opposite end, constituting a heel, 3, it is thickened, curved outwardly, and provided with an eye 4 for the reception of the handle 5. The latter in form may resemble that of a common pole-ax.

The cutting edge of the blade extends down from the handle and is curved forwardly to near the central point of said cutting edge, as at 6, whence it curves gently to its point 2. The back 7 of the blade is curved regularly from its point to its heel.

The front edge is, of course, the sharpened edge and the curvature described is such that if a brush were bent back slightly by the left hand or shoulder and the ax wielded from the end of the handle, the sharpened edge would be likely to effect a straight shear like cut on the brush, cutting it off with a straight cut and not leaving a sharp stump standing. The same effect, practically, would be had, too, if the handle were manipulated with both hands in striking the brush as one might hit a golf ball, with a slight tendency to a mowing action. It is easier to evade stones and the like that would dull the tool, than with a pole ax since by turning the sharp edge upward the ax will glance over the stone and its blade will not be injured. It is also to be observed that the tool may be effectively used in cases where needed by drawing the blade backward with its edge against the material to be cut.

With a little experience the tool can be used to accomplish all that can be done by a brush scythe, doing it easier and more quickly because of the shortness and efficiency of the form of its blade, while the latter being strong and having a shear cutting edge that may be exercised by a strong stroke it is more efficient in heavy brushwood than a pole ax.

What is claimed is—

A brush-ax having a flat blade of substantially oval form in side view, having the front end pointed and the opposite end, constituting the heel, thickened, turned outwardly and provided with an eye for the reception of the handle, the cutting edge being curved somewhat abruptly downward and forward a short distance from the heel, and thence curved forwardly less abruptly to the point, and a handle in the eye extending backward and inclined slightly upward.

In testimony whereof, I affix my signature, in presence of two witnesses.

FRED HAMMERLY.

Witnesses:
J. G. ROSS,
B. E. PADGETT.